US010244816B2

(12) United States Patent
Zanatta et al.

(10) Patent No.: US 10,244,816 B2
(45) Date of Patent: Apr. 2, 2019

(54) SPORTS SHOE INNERBOOT

(71) Applicant: ROSSIGNOL LANGE S.R.L, Montebelluna, Treviso (IT)

(72) Inventors: Luca Zanatta, Volpago del Montello (IT); Adriana Basso, Montebelluna (IT); Pascal Roux, Saint-Egrève (FR)

(73) Assignee: ROSSIGNOL LANGE S.R.L., Montebelluna (IT)

( * ) Notice: Subject to any disclaimer, the term of this patent is extended or adjusted under 35 U.S.C. 154(b) by 412 days.

(21) Appl. No.: 15/012,255

(22) Filed: Feb. 1, 2016

(65) Prior Publication Data
US 2016/0219969 A1 Aug. 4, 2016

(30) Foreign Application Priority Data

Feb. 2, 2015 (EP) .................................... 15425006

(51) Int. Cl.
| A43B 5/04 | (2006.01) |
| B29D 35/14 | (2010.01) |
| A43B 7/28 | (2006.01) |
| A43B 19/00 | (2006.01) |
| B29K 75/00 | (2006.01) |
| B29K 105/00 | (2006.01) |

(52) U.S. Cl.
CPC .............. *A43B 5/0405* (2013.01); *A43B 7/28* (2013.01); *A43B 19/00* (2013.01); *B29D 35/14* (2013.01); *B29K 2075/00* (2013.01); *B29K 2105/253* (2013.01)

(58) Field of Classification Search
CPC .......... A43B 19/00; A43B 5/0405; A43B 7/28
See application file for complete search history.

(56) References Cited

U.S. PATENT DOCUMENTS 5,265,353 A * 11/1993 Marega ................ A43B 5/0405
36/117.6
5,682,686 A * 11/1997 Condini ............... A43B 5/0405
36/10

FOREIGN PATENT DOCUMENTS

| DE | 101 48 621 A1 | 4/2003 |
| EP | 2 042 050 A1 | 4/2009 |
| EP | 2 674 049 A1 | 12/2013 |
| FR | 2 460 118 A1 | 1/1981 |
| FR | 2 644 044 A1 | 9/1990 |
| FR | 2 971 918 A1 | 8/2012 |

OTHER PUBLICATIONS

European Search Report and Written Opinion dated Jul. 6, 2015 issued in counterpart application No. EP15425006; w/ English partial translation and partial machine translation (11 pages).

* cited by examiner

*Primary Examiner* — Alexandre F Ferre
(74) *Attorney, Agent, or Firm* — Westerman, Hattori, Daniels & Adrian, LLP

(57) ABSTRACT

Comfort element (1) for a sports shoe innerboot, comprising at least one thermoformable foam having at least two zones of different thickness and forming at least one face of the comfort element with zones (4 to 8) in relief, which is able to form at least part of a layer of the wall of a sports shoe innerboot, characterized in that the product of the thickness times the density of the comfort element (1) differs between these at least two zones of different thickness.

20 Claims, 5 Drawing Sheets

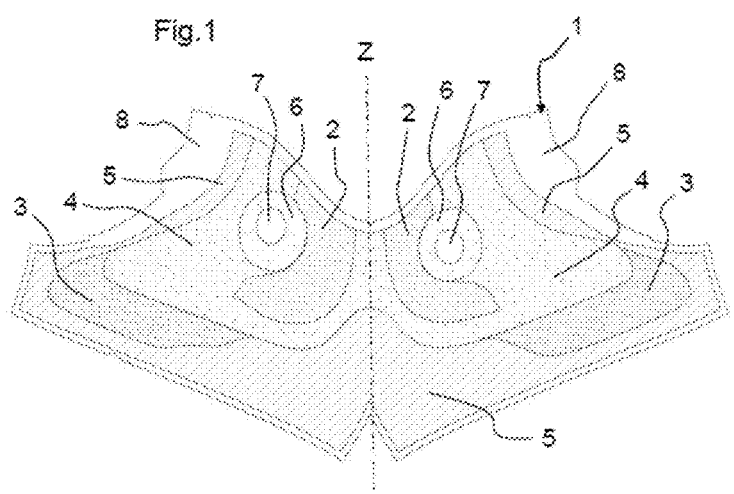
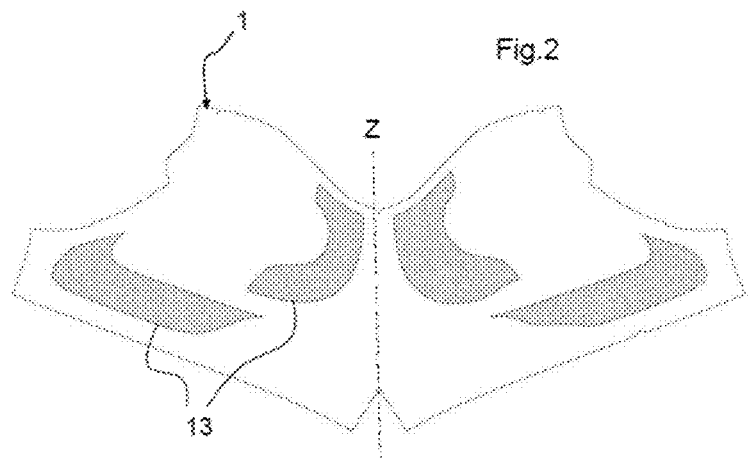

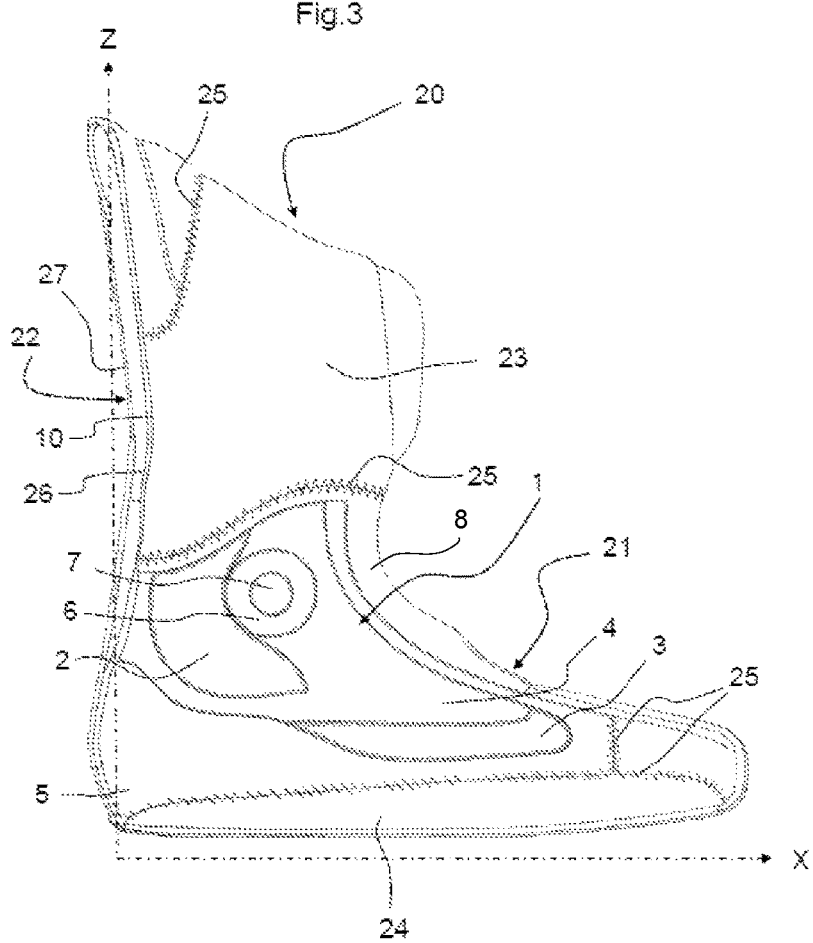

| Zone | Thickness e(measured) cm | 1/e (measured) cm$^{-1}$ | Density d(measured) kg/m$^3$ | Theoretical density achieved by thermo-compression kg/m$^3$ | Factor C= d(measured) x e(measured) | Theoretical factor C= d(theoretical) x e(measured) |
|---|---|---|---|---|---|---|
| 4 | 0.46 | 2.17391304 | 118 | 118 | 54.28 | 54.28 |
| 5 | 0.307 | 3.25732899 | 142 | 176.8078176 | 43.594 | 54.28 |
| 6 | 0.386 | 2.59067358 | 149 | 140.6217617 | 57.514 | 54.28 |
| 7 | 0.32 | 3.125 | 183 | 169.625 | 58.56 | 54.28 |
| 8 | 0.19 | 5.26315789 | 214 | 285.6842105 | 40.66 | 54.28 |

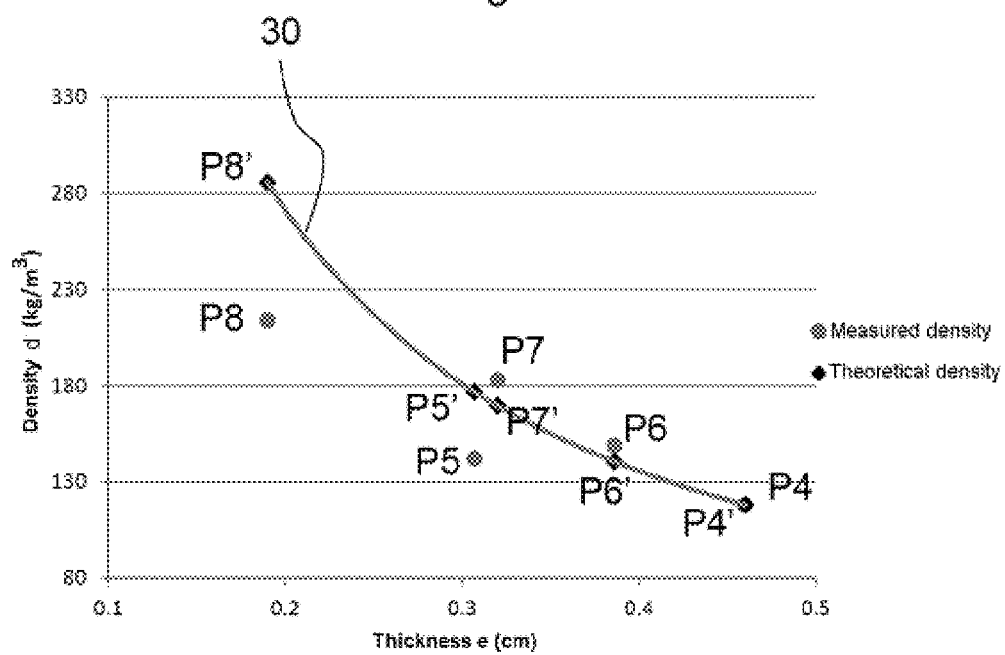

SPORTS SHOE INNERBOOT

The present invention relates to a comfort element that forms at least part of a layer of a shorts shoe innerboot and to an innerboot and sports shoe as such incorporating such a comfort element. This comfort element is particularly suitable for forming at least part of a layer of the wall of a ski boot innerboot, notably part of the interior lining intended to come into contact with the foot of the user, or more generally, for forming all or part of the wall of an item of footwear for gliding sports. It also relates to a method of manufacturing such a comfort element and to such an innerboot.

According to the prior art, a ski boot is made up of a rigid shell surrounding a comfort innerboot into which the skier slips his foot. This removable innerboot performs contradictory functions. Specifically, it needs to hold the foot firmly in place in order properly to transmit the forces and effectively guide the ski, requiring it to have a rigid structure, while at the same time keeping the skier comfortable, this requiring it to have a flexible structure so as to alleviate the uncomfortable effects of the rigid shell surrounding the innerboot. The innerboot has also advantageously to produce an initial feeling of gentleness and pleasantness as the user puts it on, because the user is highly sensitive to this.

Document FR2460118 describes an innerboot for a ski boot, of which the wall comprises an interior layer filled with an element made of expanded polyethylene, subjected to a thermocompression process. This innerboot is then heated to a certain temperature at which the polyethylene foam contained within the wall has a tendency to expand again, so as to regain some of the larger volume that it initially occupied before it was thermocompressed. An individual acquiring such an innerboot uses this property to conform the innerboot to the shape of his foot: when the innerboot is raised to the temperature at which the foam contained within its wall expands, he puts the innerboot on his foot and the wall naturally conforms to the shape of his foot as it expands, and then retains this shape after it has cooled. This method allows each individual to customize the shape of the innerboot to suit the anatomy of his foot and achieve an optimal level of comfort, sometimes at the expense of the technical performance of the innerboot.

Document EP2042050 proposes the use of a comfort element comprising an open-cell foam and having at least three zones of different thicknesses and of different densities which are obtained by compression, at the tongue of the boot. As a result, the smaller the thickness, the greater the density.

It is an object of the invention to propose a sports shoe innerboot that improves the existing solutions.

More specifically, it is a first object of the present invention to propose a solution that improves the comfort of the user of the sports shoe while at the same time ensuring that the foot is correctly held, notably is held in a way compatible with skiing.

It is a second object of the present invention to propose a sports shoe of attractive appearance.

To this end, the invention relies on a comfort element for a sports shoe innerboot, comprising at least one thermoformable foam and having at least two different zones, which is able to form at least part of a layer of the wall of a sports shoe innerboot, characterized in that the product of the thickness times the density of the comfort element differs between these at least two zones of different thickness.

Advantageously, the comfort element has at least two zones of different thickness and forming at least one face of the comfort element with zones in relief.

The invention also relates to a comfort innerboot, characterized in that it comprises such a comfort element which forms all or part of the internal lining of the innerboot.

The invention also relates to a method of manufacturing such a comfort element for a sports shoe innerboot, characterized in that it comprises the following steps:
  cutting in its thickness part of a thermoformable foam initially of constant thickness so as to obtain an intermediate element of variable thicknesses;
  positioning the intermediate element of variable thicknesses in a mould; and
  performing a thermocompression step on the intermediate element of variable thicknesses.

The invention is more specifically defined by the claims.

These objects, features and advantages of the present invention will be set out in detail in the following description of one particular embodiment given by way of nonlimiting example with reference to the attached figures among which:

FIG. 1 depicts a view of the interior face of a comfort element in a planar configuration for a sports shoe innerboot according to one embodiment of the invention.

FIG. 2 depicts a view of the second face (referred to as the exterior face) of the comfort element according to the embodiment of the invention.

FIG. 3 depicts a view in section on the midplane XZ of the sports shoe innerboot including the comfort element according to the embodiment of the invention.

Figure 4:
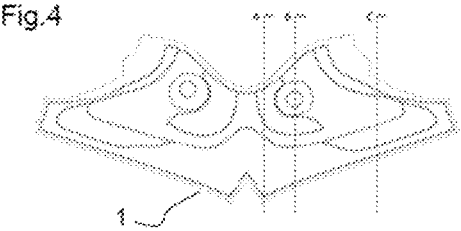
FIG. 4 depicts FIG. 1 showing transverse planes of section of the comfort element used in FIGS. 5a to 5c.
Figure 5A:
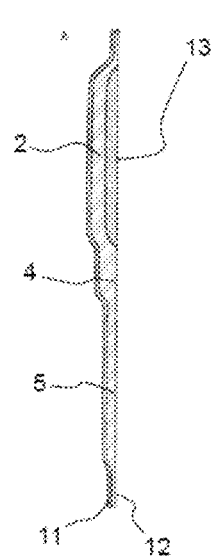
Figure 5B:
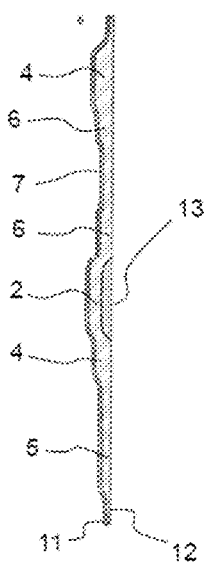
Figure 5C:
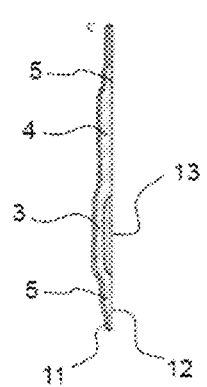

FIGS. 5a to 5c respectively depict views in section on the planes of section A to C of the comfort element in planar configuration according to the embodiment of the invention.

Figure 6:
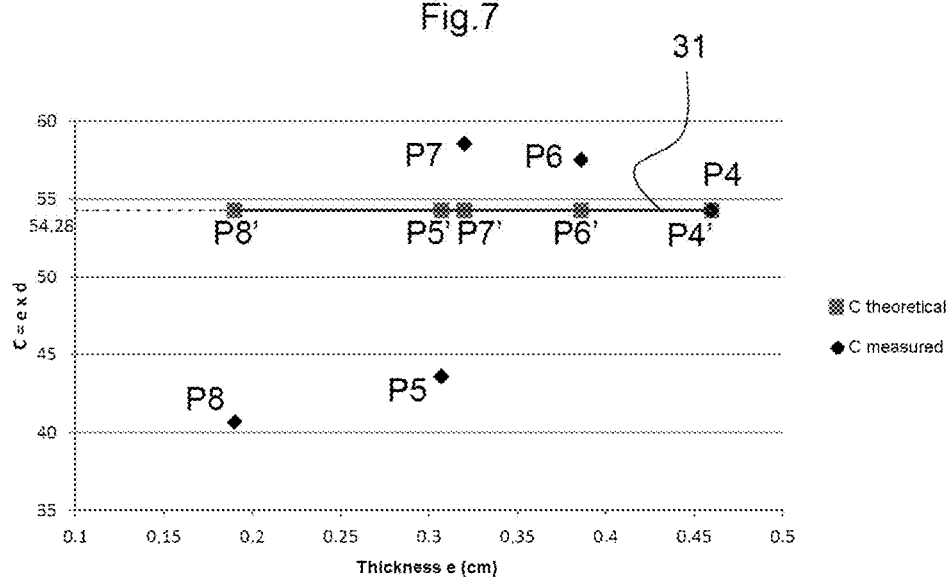

FIG. 6 is a table of the thicknesses and densities of various zones of the comfort element according to the embodiment of the invention.

FIG. 7 represents how the product of the thickness times the density evolves as a function of the thickness of the zones of the comfort element according to the embodiment of the invention.

FIG. 8 depicts how the density evolves as a function of the thickness for the zones of the comfort element according to the embodiment of the invention as compared with how it would evolve using the theoretical compression law that will be explained hereinafter.

The invention will be illustrated for the case of a removable ski boot innerboot, particularly for alpine skiing or touring skiing, but could also be implemented for surfing or cross-country skiing and also for any innerboot of a sports shoe notably intended for the sports of gliding on snow or on water and more generally for any foot-fitting part of a sports shoe, or even a sports shoe itself. Moreover, the innerboot could in all applications be not removable but connected to the external upper of the sports shoe.

According to the embodiment of the invention, the innerboot comprises a comfort element arranged at the interior layer forming the internal lining of the innerboot, which lining is intended to be in contact with the foot of a user. This internal lining 10, visible in FIG. 3, is made in part from a comfort element 1 of small thickness, less than 6 mm, the two faces of which are illustrated in FIGS. 1 and 2. This comfort element 1 comprises a first face depicted in FIG. 1, referred to as the interior face because it is intended to form the interior face of the innerboot, coming directly into contact with the foot of a user. This interior face has reliefs which are particularly visible in the views in section of FIGS. 5a to 5c. The advantageous positioning of these reliefs will be detailed later on. The comfort element 1 comprises zones 2 to 8 of various thicknesses, which form these reliefs. The second face of the innerboot, referred to as the exterior face, depicted in FIG. 2, is substantially planar and incorporates reinforcement elements 13. The comfort element 1 is substantially symmetric in its exterior contours about a central axis Z which forms an axis of bending when the comfort element 1 is being shaped. The axis Z therefore forms a vertical axis of the comfort element, as may be seen in FIG. 3. However, asymmetry is created in the positioning of the reinforcement elements 13 with respect to the axis Z, in order to conform to the natural asymmetry of the foot.

FIG. 3 in fact illustrates a comfort innerboot 20 for an alpine ski boot, which incorporates a comfort element 1 shaped volumetrically to conform to the shape of a foot. This FIG. 3 shows the left-hand (or right-hand) half of an innerboot according to the invention, showing in its interior part the comfort element 1 which forms the lower part of the internal lining 10 of the wall of the innerboot. Notably the aforementioned reliefs 2 to 8 are seen again, their position being advantageously chosen to optimise the comfort and performance of the innerboot, as will be detailed hereinafter.

The comfort element is fixed to other components to form the innerboot in its entirety, notably a sole 24 and wall parts 23. This fixing may be achieved using stitching 25, or, as an alternative, using any other fastening, such as bonding or welding.

This innerboot 20 may have a conventional shape, with a bottom part 21 completely surrounding the foot, notably covering the instep and coming up as high as ankle level, then a more open top part 22 intended to surround the ankle girth, comprising two lateral flaps positioned towards the front near a frontal tongue fixed to the bottom part at instep level.

The wall of the innerboot 20 has an at least partially traditional structure formed of three layers: an internal layer forming the internal lining 10 intended to be in contact with the foot, incorporating the comfort element 1 according to the invention, as explained hereinbelow, a more rigid external layer 27 intended to give the innerboot some integrity, these two layers 10, 27 delimiting an interior volume in which a padding material in the form of foam is positioned, forming an intermediate third padding layer 26.

Note that according to one advantageous embodiment, this padding material can be moulded by thermoforming, being for example a thermoplastic foam based on EVA and/or on polyethylene. Thus, when heated to the temperature at which it deforms, around 80° C., and preferably between 60 and 100° C., and once the foot has been inserted into the innerboot, the thermoform moulding padding material of the intermediate layer of the innerboot adopts the shape of the foot of the user in a stable and lasting manner, notably becoming compressed in the proeminent zones of the foot. As an alternative it is possible for this foam not to be a thermoform moulding foam.

The internal innerboot 10 comprises the comfort element 1 according to the embodiment in its lower part from the sole as far as the malleolus zone and in its upper part is formed of at least one fabric or foam of constant thickness, forming the wall parts 23 mentioned hereinabove. The internal lining 10 is stretched over the padding material of the intermediate padding layer 26 and is preferably soft and/or stretchy enough to ensure the comfort of the foot and follow the deformation of the said padding layer. As an alternative, the innerboot may adopt any other architecture of the prior art, but one incorporating a comfort element according to the invention.

The comfort element 1 is formed of several layers and/or several materials according to the embodiment and these are visible in FIGS. 5a to 5c and in particular include a first layer 11 and a second layer 12. The interior layer 11 forms the first face of the comfort element which is the face intended to come into contact with the foot of a user and reveals and shows the various zones in relief. It is formed of a constant thickness polyester fabric. It is of small thickness, around a few millimeters, for example around 1 to 2 mm, and can be crushed with difficulty if at all when compressed. This layer 11 may possibly be stretchy. Its function is to ensure that the innerboot is comfortable, because it is in direct contact with the foot. Another of its functions is to ensure that the innerboot looks attractive, because it is visible inside the innerboot. This interior layer 11 covers a second layer 12 of foam, that forms the second layer of the comfort element 1. These two layers 11 and 12 are secured to one another over the entire surface they have in common. The foam that forms the layer 12 may for example be a polyurethane foam. It can be thermoformed but thermoforms at temperatures much higher than those that may be encountered in a conventional in-store thermoform moulding operation performed with a view to customizing the sports shoe to conform to the foot of the user, particularly if the padding material of the padding layer 26 is itself a thermoform moulding material that can be customized. For example, the thermoform moulding temperature of the foam layer 12 is between 140 and 200° C. Indeed it is desirable for the thicknesses and densities of the comfort element not to be modified by the user, since the manufacturer of the innerboot selects these thicknesses and densities in order to guarantee the best compromise between comfort and performance. This foam 12 is of variable thickness, thus forming the reliefs visible on the interior face of the internal lining 10. Finally, the comfort element incorporates reinforcement elements 13 on its second face or exterior face, which is planar. These reinforcement elements are optional and locally compress the zone of the foam 12 that accommodates the reinforcement element 13.

According to the embodiment of the invention, it has been found that the density of the foam resulting from the conventional and theoretical compression for forming zones in relief, as described in document EP2042050, is suboptimal. This is because with this approach of the prior art, when a zone is compressed the density of the foam increases whereas the thickness decreases. There is a physical law connecting the final density d of the foam to the final thickness e of the foam after compression, and which is modelled by the formula $d = C \times 1/e$, where C is a constant referred to as the compression factor. This law, which we shall simply call the theoretical compression law, is considered to lead to an unsatisfactory result when applied in the prior art.

FIG. 8 shows how the density evolves as a function of thickness for five points $P4$ to $P8$ positioned respectively in zones 4 to 8 of the comfort element. The densities measured on the comfort element according to the invention do not follow the curve 30 of the theoretical density corresponding to the theoretical compression law recalled hereinabove. This curve 30 passes through the points $P4'$ to $P8'$ which respectively correspond to theoretical points of theoretical densities for the thicknesses identical to the points $P4$ to $P8$ respectively, but obtained by theoretical and conventional compression of a comfort element initially having the same thickness as the comfort element according to the embodiment of the invention. Note that this effect which is applied first of all to the thermoformable foam of the layer 12 of the comfort element is passed on likewise to the comfort element, the thickness and density of which can be measured by considering all of its layers if it is not a single-layer structure.

According to the invention, in the zones 4 to 8 without reinforcement elements 13, the embodiment has zones in relief, with various thicknesses, something which presents advantages that will be detailed hereinafter. However, the density of the foam of the comfort element differs, at least in certain zones, from the theoretical compression law. Notably the density thereof does not increase as significantly as its thickness decreases as it would by applying the theoretical compression law. Specifically, in the case of the invention, the products d(measured)×e(measured) in various zones are not substantially constant, as illustrated by FIG. 7. In effect, this FIG. 7 represents the product of the density times the thickness as a function of the thickness for five points P4 to P8 positioned respectively in the zones 4 to 8 of the comfort element. In addition, it illustrates this product as being constant in the form of a horizontal straight line 31 passing through the points P4' to P8' that respectively correspond to theoretical points of theoretical densities for thicknesses identical to the points P4 to P8 respectively but obtained by theoretical and conventional compression of a comfort element initially having the same thickness as the comfort element according to the embodiment of the invention. It is clearly evident from FIG. 7 that the points P4 to P8 are not aligned, and therefore that the density times thickness product varies. In this embodiment, this variation is significant, ranging from −25% to +8% with respect to the theoretical value, but it is possible to contemplate other embodiments that induce variations that are smaller, but greater than or equal to 2%, or even a variation of at least plus or minus 5%. Furthermore, it would also seem that this product may be higher than the theoretical value illustrated by the curve 31 (see points P4, P6, P7) or lower (see points P5, P8).

In the case illustrated, the density of the comfort element varies little and its variation is less than or equal to plus or minus 30% with respect to the mean density, for a thickness varying by a factor of three between the thickest zone and the least-thick zone. For such a variation in thickness, the aforementioned theoretical compression law easily leads to far greater variations in density, notably of 60% or more. As an alternative, the thickness of the comfort element 1 may vary differently, preferably at least from a single to double thickness between its various zones. Further specifics regarding these data on the density of the foam of the comfort element will be given later on.

Within the context of the invention, it is possible to contemplate a comfort element in which all the zones are of different thicknesses and of constant density or even to obtain a comfort element having highly varied densities corresponding to various thicknesses, the product of the thickness times the density in the zones being non-constant.

In the prior art using the theoretical compression law, when a foam of variable thickness is to be obtained, the initial density of the initial non-compressed foam therefore leads to precise densities that can be calculated using the theoretical compression law and that are often unsatisfactory because they are generally too dense when the thickness becomes small.

The comfort element 1 therefore comprises zones 4 to 8 of different density and different thickness. These zones in relief notably allow an advantageous layout of the comfort element in the (external and/or internal with respect to the foot) malleolus zones and in the heel zone.

In addition, by adding reinforcement elements 13 at the zones 2 and 3 of the comfort element formed of the layers 11 and 12, it is possible to provide additional rigidity in these zones and therefore obtain sufficiently high density in a zone of great thickness in which the density of the foam 12 often remains low. These reinforcement elements 13 also allow an advantageous layout in the zones near the metatarsals (on the outside and/or inside of the foot) and/or to the rear of the malleolus.

The reinforcement elements 13 are made from a material similar to that of which the layer 12 or even the layer 11 is/are made, preferably foam or fabric. They may have different densities by comparison with the layers 11 and 12. They may also be made from any other compressible or incompressible plastic. Furthermore, the reinforcement elements 13 are situated on the exterior face of the comfort element, but could also be situated on the internal face thereof.

Thus, according to the embodiment, a substantially disc-shaped recessed zone 7, supplemented by another recessed transition zone 6 forming an annulus around the first recessed zone 7, are provided at the site of the malleolus. These recessed zones 6, 7 free up space so as not to knock the malleolus but remain sufficiently soft to provide comfort in contact with the malleolus. To the rear of the malleolus, a thicker retaining zone 2 is positioned for holding the innerboot at malleolus level while at the same time forming an end stop that prevents the malleolus from becoming too deeply embedded in the aforementioned recessed zones 6, 7. This retaining zone 2 is crescent-moon shaped to extend around the malleolus over substantially the entire rear half of the periphery around the malleolus and prevents the foot from sliding backwards. In order to perform its retaining function, this retaining zone 2 is more rigid than the rigidity that would be obtained by the simple theoretical compression law. Thus, for example, this retaining zone 2 is more dense than the intermediate zone 4 even though it has a smaller thickness than this retaining zone 2. The intermediate zone 4 has a relatively high thickness, somewhere between that of the recessed zones 6, 7 and of the retaining zone 2. It thus forms a transition zone allowing a progressive variation in the thickness of the comfort element 10. This zone 4 is present in the zone of the Achilles tendon and is able to conform to the natural curvature of the foot that exists above the heel, again with a view to immobilizing the foot.

This comfort element 1 additionally comprises a thick zone 3 made up of the bilayer formed of the layers 11 and 12 and of a reinforcing element 13 of thickness substantially equal to that of the retaining zone 2 and the density of which is also relatively great, in the region of the metatarsals. It is of significant thickness and of sufficient density to ensure good contact of the innerboot with the front lateral parts of the foot (at metatarsal level), something which is beneficial for good transmission of the forces exerted by the foot, useful when performing a gliding sport such as skiing.

Finally, the comfort element defines a more compressed zone 5 in the heel region, with a smaller thickness than the aforementioned zones, or a thickness substantially equal to that of the recessed zones 6, 7 at the malleolus. This zone 5 defines a housing for immobilizing the heel and preventing or limiting the sliding of the foot towards the front of the innerboot.

Note that the comfort element 1 additionally comprises an even more compressed and smaller-thickness peripheral zone 8 which acts as its link with traditional complementary parts that have not been depicted, except in part in FIG. 3, for connecting this comfort element at its edges to the other edges of the layers that form the wall of the innerboot, notably using stitching 25.

The shapes of the reliefs described hereinabove are given by way of nonlimiting example. In more general terms, the invention defines reliefs to make it possible to achieve an optimal compromise between comfort and technical performance of the innerboot, allowing it to perform the technical function of guiding a gliding device while at the same time providing foot comfort. It should notably be pointed out that the invention defines recessed zones of lesser thickness the density of which is not too high, so as to avoid too great a reduction in comfort in these recessed zones. Conversely, it defines thicker zones the density of which is not too low, so as to avoid excessively reducing the rigidity and technical performance of the innerboot in these zones. Ultimately, therefore, it offers a shape with reliefs the density of which remains relatively consistent, and varies less than if these same reliefs were formed from a simple compression of a homogeneous foam of constant thickness (according to the theoretical compression law). As an alternative, the comfort element may have reliefs different from those described, preferably comprising at least three zones of different thickness.

In particular, the densities are chosen according to the retention and comfort requirements and the factor C equal to the product of the density times the thickness is not constant across the entirety of the comfort element.

The table in FIG. 6 gives the thicknesses and densities chosen for the various zones 4 to 8 of the comfort element according to the embodiment of the invention. The final column gives, by way of example, the constant factor C that would be obtained by the theoretical compression law using the same initial foam, uniform and of constant thickness, and applying simple thermocompression moulding to it in place of the method according to the invention, which will be described hereinafter. FIG. 8 illustrates this difference in the distribution of density with respect to this theoretical compression law, as explained hereinabove. The points P4 to P8 show the values obtained with the embodiment of the invention, explained in the table of FIG. 6. It will be noted for example that the comfort element 1 comprises zones 6, 7 that are thicker than a zone 5 although of greater density, something which runs counter to the theoretical compression law. It will also be noted in the case of the peripheral zone 8 that the comfort element may have zones the thickness of which is small without thereby obtaining too high a density.

The invention also relates to the method for manufacturing a comfort element 1 of an innerboot or sports shoe.

To do that, a first step is to start with a flat initial element comprising a thermoformable foam which is uniform on its surface and of constant thickness, compressible, and intended to form the second layer 12 in relief mentioned hereinabove. In order to obtain the values illustrated in the table of FIG. 6 of the embodiment, a foam with a density of around 60 kg/m$^3$ and a thickness of between 6 mm and 2 cm can be used. This flat initial element is combined with an interior layer 11 consisting of a fabric, as mentioned hereinabove with reference to FIGS. 5a to 5c. As an alternative, to manufacture a single-layer comfort element, this interior layer 11 is omitted. As an alternative, the second layer 12 may be made up of a superposition of layers of different foams.

A second step in the method is to cut part of the foam, on the side of the face provided with the foam 12, in the case of the embodiment of the invention on the side of the exterior face of the initial element. This cut is performed nonuniformly, in order ultimately to form reliefs on this face. It may for example be done using machining. This may be any cut into the thickness of the foam. More generally, it thus involves working the initial element in order to obtain a foam of constant density and variable thickness, thus forming an intermediate variable-thickness foam element.

A third step in the method comprises a step of thermocompression in a mould comprising the desired reliefs, by heating and/or by high frequency or even using ultrasound on the intermediate element originating from the second step, at a temperature generally of between 140 and 200° C. Because this compression is performed on an element of variable thickness, the resulting final element that forms the comfort element has a thickness and a density which differ from the theoretical compression law and that would be obtained by simple compression of the initial element, without implementing the second step.

Naturally, the choice of the zones and of the thickness for the cuts made during the second step ultimately makes it possible to reduce the density of the foam in said zones. The choice of the thickness of cutting thus makes it possible to fix precisely the final density that will be obtained, by knowing the future compression to be applied. A person skilled in the art will therefore calculate the positioning and thickness of these cuts according to the desired result.

As an alternative, the manufacturing method may involve an additional step between the second and third steps, of bonding one or more reinforcement elements 13 to the exterior or even internal face of the intermediate element. The addition of reinforcement elements 13 makes it possible to widen the options for determining a certain density at a particular point on the resultant comfort element. In particular it makes it possible to increase the overall density and rigidity of the comfort element or of the innerboot in certain relatively thick zones that are not very heavily compressed and potentially not very dense. In the exemplary embodiment illustrated, reinforcement elements 13 are thus used at the zones 2, 3 of the comfort element.

Next, the manufacturing method involves a step of volumetric forming of the comfort element and a connecting step to form the internal lining 10 and the innerboot 20. This internal lining is generally stitched flat to other parts of the wall of the innerboot, then the entire innerboot is shaped.

Note that a single comfort element 1 has been illustrated in the foregoing examples. Several comfort elements according to the invention, comprising one or more layers of foam formed of different materials and/or having different initial densities, may be superposed or juxtaposed within the wall of part of a shoe. The comfort element 1 used has two layers (or three including the reinforcement elements 13). As an alternative, it could have a single layer structure or comprise more than two or three layers of compressible foams of different densities. It is advantageous because it is simple to manufacture while achieving a satisfactory result, allows the starting point to be an initial element comprising a single layer of uniform foam which may or may not be covered with a thin incompressible cover fabric thus making it possible to contemplate a comfort element including a single layer of foam, namely comprising the same thermoformable foam over substantially the entire surface thereof, but at different thicknesses and/or different densities. It also has a special shape that allows it to cover the foot from the heel to the front of the foot, and from the heel to the ankle girth. As an alternative, it could cover a different surface around the foot and in particular cover just a restricted zone of the foot, or even constitute the entirety of the innerboot. Advantageously, it corresponds to a significant area of the sports shoe. In addition, such a comfort element according to the invention remains compatible with combined use with conventional comfort elements of the prior art.

In the example described hereinabove, the comfort element according to the invention was advantageously positioned on the interior surface of the innerboot. This positioning allows the shoe to have a comfortable interior wall, with an attractive appearance, and that provides good immobilization of the foot by preventing it from moving forwards and backwards and also sideways, the reliefs created being directly in contact with the foot. However, the comfort element could be positioned somewhere else within the thickness of the shoe while at the same time providing an effective response to the requirements of comfort and rigidity. For example, it may be incorporated into the thickness of the wall of the innerboot as a layer of padding. In such an implementation it could comprise a far greater thickness, for example between one and three centimeters. According to yet another alternative form, it could be thick enough to form the entirety of the thickness of the wall of the innerboot, at least in a certain zone, or even to form the entirety of the innerboot.

The reliefs have been created on just one face of the comfort element, particularly the interior face thereof. As an alternative, reliefs could be created on both faces of the comfort element, during the third step of the method, through use of a suitable mould.

Such a comfort element is particularly well suited to the innerboots of sports shoes that have rigid external uppers, such as ski boots, for which achieving comfort represents a technical problem that is particularly difficult to resolve. However, it may also advantageously be used for other sports shoes.

The comfort innerboot according to the invention incorporates a thermoformable foam intended to be thermoformed at the factory to create specific zones in relief in which the densities and thicknesses of each zone are chosen to optimize the comfort and retention of the user's foot.

According to one particular alternative form of embodiment, the reliefs of the comfort element could be greatly reduced, or even completely eliminated, and the comfort element would then have a thickness that was constant, or substantially constant, but with zones of different densities.

Finally, the invention has indeed achieved the desired objectives and notably offers the following advantages:
- it makes it possible to achieve a comfort element that forms an ideal compromise between the function of retaining and immobilizing the foot within the shoe, the function of guiding the ski when skiing and the function of comfort for the user's foot, through the choice of the desired thicknesses and densities for the various zones of the innerboot;
- it makes it possible to obtain this comfort element in a way that is simple and inexpensive from a simple initial monolayer or multilayer element of constant thickness and constant density that is uniform over its entire surface.

The invention claimed is:

1. Comfort element for a sports shoe innerboot, comprising a thermoformable foam having at least two zones of different thicknesses formed from a same initial foam material of the thermoformable foam,
wherein the at least two zones form at least one face of the comfort element, the at least one face having areas in relief,
wherein the comfort element is adapted to form at least part of a layer of a wall of the sports shoe innerboot,
wherein a product of the thickness times the density of the comfort element differs between the at least two zones of different thicknesses.

2. Comfort element according to claim 1, wherein the comfort element comprises at least two zones of different thickness for which the product of the thickness times the density of the thermoformable foam differs by about at least 5%.

3. Comfort element according to claim 2, wherein the comfort element comprises at least one zone that is thicker than another zone and of greater density.

4. Comfort element according to claim 2, wherein the comfort element comprises an interior face exhibiting reliefs and a second face that is planar.

5. Comfort element according to claim 1, wherein the comfort element comprises at least one zone that is thicker than another zone and of greater density.

6. Comfort element according to claim 5, wherein the comfort element comprises an interior face exhibiting reliefs and a second face that is planar.

7. Comfort element according to claim 1, wherein the comfort element comprises an interior face exhibiting reliefs and a second face that is planar.

8. Comfort element according to claim 1, wherein at least one selected from the group consisting of (i) the comfort element comprises a thickness that varies by at least 100% among the various zones and (ii) the comfort element comprises a density varying at most by 30% with respect to the mean density.

9. Comfort element according to claim 1, wherein the comfort element comprises a thermoformable foam made up of several superposed parts of thermoform moulding foams.

10. Comfort element according to claim 1, wherein the comfort element comprises at least one reinforcement element at a planar face of the comfort element or at a face which comprises reliefs.

11. Comfort element according to claim 1, wherein the comfort element comprises:
at least one recessed zone intended to sit at user malleolus level, or
at least one recessed zone intended to sit at user malleolus level and at least one zone of greater thickness intended to surround part of a rear circumference of the malleolus.

12. Comfort element according to claim 1, wherein the comfort element comprises at least one selected from the group consisting of:
(i) a zone that is thicker than adjacent zones and intended to come into contact with a metatarsal part of the foot of a user; and
(ii) a zone of lesser thickness than adjacent zones and intended to sit at user heel level.

13. Comfort element according to claim 1, wherein the comfort element comprises at least one selected from the group consisting of (i) a zone of greater thickness intended to surround part of a rear circumference of a malleolus, the zone of greater thickness comprising a layer with reinforcement element, and (ii) a zone thicker than adjacent zones and intended to come into contact with a metatarsal part of a foot of a user, the thicker zone comprising a layer with reinforcement element.

14. Comfort element according to claim 1, wherein the comfort element comprises a layer of stretch fabric of constant thickness conforming to the reliefs of the thermoformable foam of the comfort element and intended to lie on an interior surface of an innerboot.

15. Comfort innerboot for sports shoe, comprising a wall comprising a comfort element according to claim 1.

16. Comfort innerboot according to claim 15, wherein the comfort element forms all or part of an internal lining of the innerboot, the face in relief being intended to come into contact with a foot of a user, or wherein the comfort element forms all or part of a layer of padding of the wall of the innerboot, comprised between an internal lining and an external layer.

17. Sports shoe comprising an external shell, comprising a removable or non-removable comfort innerboot according to claim 15.

18. Comfort element according to claim 1, wherein the thermoformable foam is continuous.

19. Method of manufacturing a comfort element for a sports shoe innerboot, comprising:
cutting in a thickness part of a thermoformable foam initially of constant thickness so as to obtain an intermediate element of variable thicknesses;
positioning the intermediate element of variable thicknesses in a mould; and
performing a thermocompression on the intermediate element of variable thicknesses, so as to obtain the comfort element according to claim 1.

20. Method of manufacturing a comfort element according to claim 19, comprising an intermediate action involving positioning at least one reinforcement element on a face of the intermediate element of variable thicknesses prior to the thermocompression.

* * * * *